United States Patent Office 3,042,698
Patented July 3, 1962

3,042,698
ORGANIC PHOSPHORUS COMPOUNDS
Gail H. Birum, Dayton, Ohio, assignor to Monsanto Chemical Company, St. Louis, Mo., a corporation of Delaware
No Drawing. Filed Sept. 22, 1959, Ser. No. 841,443
9 Claims. (Cl. 260—461)

The present invention relates to organic compounds of phosphorus.

An object of this invention is to provide new and useful organic compounds containing pentavalent phosphorus atoms.

A more specific object is to provide new and useful classes of aryl phosphate and phosphorothioate compounds which contain phosphinylhydrocarbyloxy radicals.

Other objects of this invention will appear from the description hereinafter.

In copending application, S.N. 780,222, filed December 15, 1958, there are disclosed and claimed compounds of the formula

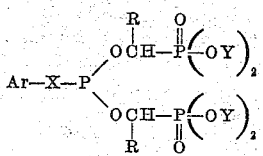

wherein Ar is selected from the class consisting of aromatic hydrocarbons and halogen-substituted aromatic hydrocarbons which are free of aliphatic unsaturation and contain from 6 to 12 carbon atoms, X is selected from the class consisting of oxygen and sulfur, R is selected from the class consisting of hydrogen and hydrocarbyl radicals which are free from aliphatic unsaturation and which contain from 1 to 11 carbon atoms, and Y is selected from the class consisting of alkyl and haloalkyl radicals of from 1 to 12 carbon atoms, and a method of making them. Those compounds can be described as being aromatic phosphite esters having phosphinylhydrocarbyloxy radicals attached to the phosphorus atom thereof. They can also be classified as phosphite-phosphonate compounds which signifies the phosphorus linkage therein.

This invention is directed to new and useful phosphate and phosphorothioate compounds of the general formula

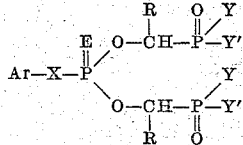

wherein Ar is selected from the group consisting of aromatic hydrocarbons and halogen-substituted aromatic hydrocarbons which are free from aliphatic unsaturation and contain from 6 to 12 carbon atoms, X is selected from the group consisting of oxygen and sulfur, R is selected from the group consisting of hydrogen and hydrocarbyl radicals which are free from aliphatic unsaturation and which contain from 1 to 11 carbon atoms; Y and Y' are each selected from the group consisting of hydrocarbyl, hydrocarbyloxy, halohydrocarbyl, and halohydrocarbyloxy radicals having from 1 to 12 carbon atoms and which are free from aliphatic unsaturation, and E is selected from the group consisting of oxygen and sulfur. The term "hydrocarbyl" as used in this case, is defined in Degering, An Outline of Organic Chemistry, 5th Edition (1947), page 135, as follows: "Hydrocarbyl is the radical obtained by the loss of a hydrogen atom from any hydrocarbon."

The compounds of this invention can be described as aryl- or haloaryl phosphates or phosphorothioates having phosphinylhydrocarbyloxy radicals attached to the phosphorus atom thereof. They are also referred to in this specification by the general terms of phosphate-phosphonates, phosphate-phosphinates, and phosphate-phosphine oxide derivatives, depending upon the types of phosphorus linkages which exist in the compounds. For example,

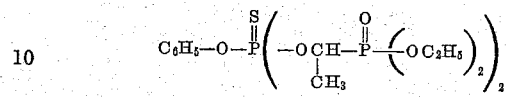

is O,O-bis[1-(diethoxyphosphinyl)ethyl] O-phenyl phosphorothioate and generally referred to as a phosphate-phosphonate; whereas,

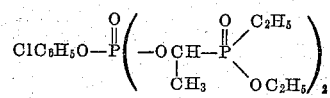

is bis[1 - (ethylethoxyphosphinyl)ethyl] chlorophenyl phosphate and generally referred to as a phosphate-phosphinate; and

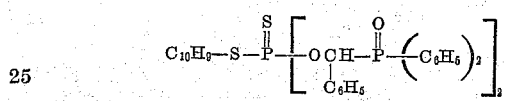

is O,O - bis[α-(diphenylphosphinyl)benzyl] S-naphthyl phosphorodithioate and generally referred in this specification as a phosphate-phosphine oxide derivative.

The phosphinylhydrocarbyloxy aryl phosphate and phosphorothioate esters of this invention, described above, can be prepared by reacting a phosphinylhydrocarbyloxy aryl phosphite or a phosphorothioite, i.e., one of those compounds generally classified in this specification as a phosphite-phosphonate, phosphite-phosphinate, or a phosphite-phosphine oxide derivative, with an oxidizing agent or elemental sulfur to produce the respective phosphate-phosphonate, phosphate-phosphinate, or phosphate-phosphine oxide derivative when an oxidizing agent is used and the respective phosphorothioate-phosphonate, phosphorothioate-phosphinate, or phosphorothioate-phosphine oxide derivative when sulfur is used. Thus when a phosphite-phosphonate compound of the type

where Ar, X and R are as defined above and hydro denotes a hydrocarbyl or halohydrocarbyl radical having from 1 to 12 carbon atoms, is treated with an oxidizing agent or sulfur, the resulting reaction product is a phosphate-phosphonate when the oxidizing agent is used and a phosphorothioate-phosphonate when sulfur is used. Examples which illustrate the phosphite-phosphonate reactants and the resulting product when an oxidizing is used are:

Bis[1-(dipropoxyphosphinyl)ethyl] phenyl phosphite to yield bis [1-(dipropoxyphosphinyl)ethyl] phenyl phosphate, Bis{α - [bis(2-chloroethoxy)phosphinyl]benzyl}2,4,6 - trichlorophenyl phosphite to yield bis{α-[bis(2-chloroethoxy) - phosphinyl]benzyl}2,4,6-trichlorophenyl phosphate, Bis[1-(hexyloxypropoxyphosphinyl)hexyl] cumyl phosphite to yield bis[1-(hexyloxypropoxyphosphinyl)hexyl] cumyl phosphate, and Bis{α - [bis(4 - chlorophenoxy)phosphinyl]p - methylbenzyl} α-napthyl phosphite to yield bis{α-[bis(4-chlorophenoxy)-phosphinyl]p-methylbenzyl} α-naphthyl phosphate.

O,O-bis{1-[(2-bromohexyloxy)(2-bromophenoxy)phosphinyl]-α-naphthyl}S-p-tolyl phosphorothioite to yield O,O - bis{1-[(2-bromohexyloxy)(2-bromophenoxy)phosphinyl]-α-naphthyl}S-p-tolyl phosphorothioate.

When a phosphite-phosphonate compound of the above general type is treated with sulfur, phosphorothioate-phosphonate products are obtained. Examples of reactants and the resulting products are:

Bis[α-(dimethoxyphosphinyl)naphthyl] p - ethylphenyl phosphite to yield O,O-bis[α-(dimethoxyphosphinyl)-naphthyl] O-p-ethylphenyl phosphorothioate, O,O-bis{1-[bis(4-bromopentyloxy)phosphinyl]methyl} S-pentabromophenyl phosphorothioite to yield O,O-bis-{1-[bis(4-bromopentyloxy)phosphinyl] methyl} S-pentabromophenyl phosphorodithioate, O,O - bis{1-[(2-chloroethoxy)(3-bromopropoxy)phosphinyl]octyl} S-β-bromo-α-naphthyl phosphorothioite to yield O,O - bis{1 - [(2-chloroethoxy)(3 - bromopropoxy) phosphinyl]octyl} S-β-bromo-α-naphthyl phosphorodithioate, and O,O-bis{1-[(4 - bromophenoxy)phenoxyphosphinyl]-n-decyl} S-2-methyl-α-naphthyl phosphorothioite to yield O,O - bis{1 - [(4-bromophenoxy)phenoxyphosphinyl]-n-decyl} S-2-methyl-α-naphthyl phosphorodithioate.

When a phosphite-phosphinate compound of the type

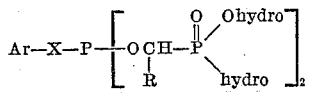

wherein Ar, X, R, and hydro are as defined above is treated with an oxidizing agent there is obtained a phosphate-phosphinate compound. Examples of reactants used and products obtained are:

Bis{1 - [(propoxy)ethylphosphinyl]cyclohexyl} phenyl phosphite to obtain bis{1-[(propoxy)ethylphosphinyl]-cyclohexyl} phenyl phosphate, O,O-bis[1-(ethoxyphenylphosphinyl) - 2 - ethylhexyl]-S-2,4,6-trichlorophenyl phosphorothioite to obtain O,O-bis[1-(ethoxyphenylphosphinyl) - 2 - ethylhexyl]-S-2,4,6-trichlorophenyl phosphorothioate, and O,O - bis{α - [(2,4-dimethylphenoxy)dodecylphosphinyl]-4-n-butylphenyl} S-biphenylyl phosphorothioite to obtain O,O - bis{α-[(2,4-dimethylphenoxy)dodecylphosphinyl]-4-n-butylphenyl} S-biphenylyl phosphorothioate.

When a phosphite-phosphinate of the above general type is treated with sulfur as indicated herein, there is obtained a phosphorothioate-phosphinate, or if X is sulfur, a phosphorodithioate-phosphinate. Examples of reactants and products of this type are:

Bis[(methoxydecylphosphinyl)methyl] benzyl phosphite to obtain bis[(methoxydecylphosphinyl)methyl] benzyl phosphorothioate, O,O - bis[1-(phenoxyphenylphosphinyl)nonyl] S-4-(trichloromethyl)phenyl phosphorothioite to obtain O,O-bis-[1 - (phenoxyphenylphosphinyl)nonyl] S - 4 - (trichloromethyl)phenyl phosphorodithioate, and Bis{1 - [(phenyl)heptyloxyphosphinyl]undecyl} phenyl phosphite to obtain O,O-bis{1-[(phenyl)heptyloxyphosphinyl]undecyl} O-phenyl phosphorothioate.

When compounds of the formula

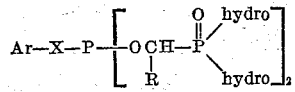

wherein Ar, X, R, and hydro are as defined above are treated with one of the selected oxidizing agents, phosphate-phosphine oxide compounds are prepared, except that when X is sulfur, phosphorothioate-phosphine oxide compounds are prepared. Examples of reactants that can be used and the products obtained are:

Bis[α-(dimethylphosphinyl) - p-propylbenzyl] 2-chloro-p-tolyl phosphite to obtain bis[α-(dimethylphosphinyl)-p-propylbenzyl] 2-chloro-p-tolyl phosphate, O,O-bis[1-(dipropylphosphinyl)propyl] S-4-amylbenzyl phosphorothioite to obtain O,O-bis[1-(dipropylphosphinyl)propyl] S-4-amylbenzyl phosphorothioate, and Bis{1 - [(2 - chlorophenyl)(α - naphthyl)phosphinyl]-ethyl} α-naphthyl phosphite to obtain bis{1-[(2-chlorophenyl)(α-naphthyl)phosphinyl]ethyl} α-naphthyl phosphate.

When a phosphite-phosphine oxide derivative compound of the above type is treated with sulfur as indicated herein, phosphorothioate-phosphine oxide compounds are obtained, except that when X is sulfur phosphorodithioate-phosphine oxide compounds are obtained. Examples of reactants of this type and the products obtained are:

Bis[1-(dioctylphosphinyl)butyl] phenyl phosphite to yield O,O - bis[1 - (dioctylphosphinyl)butyl] O-phenyl phosphorothioate, Bis{α-[(2 - chlorophenyl)butylphosphinyl]benzyl} 3-iodophenyl phosphite to obtain O,O-bis{α-[(α-chlorophenyl)butylphosphinyl]benzyl} O-3-iodophenyl phosphorothioate, and O,O-bis{1 - [(4 - chloro-2-methylphenyl)benzylphosphinyl]octyl} S-α-naphthyl phosphorothioite to obtain O,O - bis{1 - [(4 - chloro-2-methylphenyl)benzylphosphinyl]octyl} S-α-naphthyl phosphorodithioate.

We have found that many oxidizing compounds will convert the trivalent phosphite phosphorus atom of the aryloxy and arylthio phosphite-phosphonate, phosphite-phosphinate, and phosphite-phosphine oxide derivatives to the pentavalent state and supply an oxygen atom thereto without disturbing the linkages of the other groups attached thereto. Some of those which are preferred, however, are the peroxycarboxylic acids, both aromatic and aliphatic, hydroperoxides, hydrogen peroxide, ozone, oxygen, and nitrogen oxides such as nitrogen tetraoxide. Air may be used but the use of air is not preferred. Although the common inorganic oxidizing agents, such as KMnO$_4$, CrO$_3$, etc. would accomplish the oxidation, they are not preferred for reasons of expense, salt by-product complications, etc. To prepare the aryloxy and arylthio phosphorothioate-phosphonate, phosphorothioate phosphinate, and phosphorothioate-phosphine oxide derivatives of this invention, elemental sulfur is used. In either case, i.e. whether the phosphate or phosphorothioate products are being prepared, the respective aryloxy or arylthio phosphite-phosphonate, phosphite-phosphinate, or phosphite-phosphine oxide derivative is usually contacted with stoichiometric or slight excess quantities of oxidizing agent or sulfur. The mixture is warmed, when necessary, to insure complete reaction. Any excess oxidizing agent or sulfur can easily be removed by known physical means, e.g., filtration, volatilization, extraction, etc.

Reaction of the respective phosphite-phosphonate, phosphite-phosphinate, or phosphite-phosphine oxide derivative and the oxidizing agent or sulfur can take place at room temperature. However, when using the highly reactive oxidizing agents, it is often times preferred to cool the mixture, generally at between −70 and 20° C., depending upon which reactants are combined, to control the speed of the resulting exothermic reaction. On the other hand, the reaction of the respective phosphite and sulfur mixture is usually most practically accomplished by warming the mixture at from 50° to 100° C. to initiate the reaction and then to a higher temperature of from 130° C to 180° C. to insure completion of the reaction.

The oxidation or thionation of the phosphite-phosphonate, phosphite-phosphinate, and phosphite-phosphine oxide derivatives is readily conducted in the absence of an inert solvent, or catalyst. However, solvents and catalysts may be employed. The use of solvents may be particularly advantageous when working with the highly active oxidizing agents or the more viscous phosphite-phosphonates, phosphite-phosphinates, and phosphine oxide derivatives. Such solvents may be e.g., benzene, toluene, xylene, dioxane, alkylene halides such as methylene chloride and methylene bromide, hexane, and mixtures thereof. Although no particular order of contacting the oxidizing agent or sulfur with the phosphite need be employed, it is good practice to add the oxidizing agent or sulfur portionwise to the respective phosphite to avoid unduly exothermic reactions and waste of reactants.

The aromatic radical-containing phosphinylhydrocarbyloxy phosphates and phosphorothioates of this invention are stable, usually high-boiling materials which range from viscid liquids to waxy or crystalline solids. They are useful as plasticizers, functional fluids, gear and lubricant oil additives and dielectrics. They are useful as biological toxicants in quantities ranging from 1 to 10 parts per million up to 10,000 parts per million, depending upon the nature of the organism. They are useful as lead scavengers in leaded gasolines in quantities of from 0.05 to 10.0 moles per mole of lead in the gasoline. They are useful as fire-retardant additives in many polymeric materials, such as urea-formaldehyde, and phenol-formaldehyde, epoxy, and other oxygen containing resins, in polyester type compositions such as polyterephthalates, polyacrylonitrile, and polyamide polymers used to make fibers, in poly-urethane and poly-styrene-containing foams, in rubber based emulsion type coatings, as well as cellulosic and carbonaceous combustible materials in quantities ranging from 0.5 to 10% by weight depending upon the material to which they are added.

*Example 1*

This example illustrates the method of preparation of the phosphite starting materials used in this invention. Specifically it illustrates the preparation of a phosphite-phosphinate material (A) and the thionation thereof with sulfur to prepare the phosphorothioate-phosphinate (B).

(A)

$2C_6H_5P(OC_2H_5)_2 + C_6H_5OPCl_2 + 2CH_3CH_2CHO \longrightarrow$

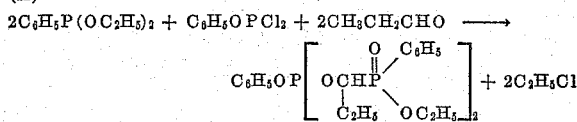

A 500 ml. flask equipped with a stirrer, thermometer, condenser with drying tube, and a dropping funnel was charged with 19.8 g. (0.1 mole) of diethyl phenylphosphonite and 5.8 g. (0.1 mole) of propionaldehyde. Then 9.8 g. (0.05 mole) of phenoxyphosphorus dichloride was added dropwise in 5 minutes at 25°–30° C. while cooling the mixture throughout the addition. When the addition was completed, the mixture was heated to 130° C. to insure complete reaction. The mixture was then cooled, placed under vacuum, and heated to 150° C. to remove the ethyl chloride by-product. The residue was substantially pure bis[1-(ethoxyphenylphosphinyl)propyl] phenyl phosphite.

(B)

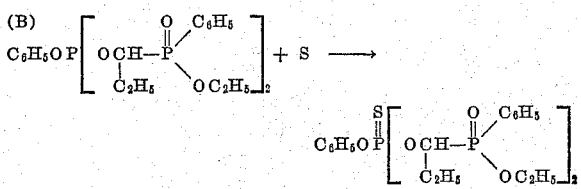

1.3 g. of sulfur was added to the bis[1-(ethoxyphenylphosphinyl)propyl] phenyl phosphite prepared above and the mixture was stirred for 10 minutes during which time there occurred a 2° C. increase in temperature from room temperature. The mixture was then warmed and when the temperature reached 115° C., all of the sulfur had dissolved. The mixture was cooled to 100° C. and 0.2 g. more of sulfur was added. Heating was resumed and when the temperature reached 130° C. all the sulfur had reacted. On cooling, the product, O,O-bis[1-(phenylethoxyphosphinyl)propyl] O-phenyl phosphorothioate, was obtained as a pale yellow, very viscous liquid.

The phosphite-phosphine oxide compounds react in a similar manner to give phosphorothioate-phosphine oxide derivatives with sulfur and phosphate-phosphine oxide derivatives with an oxidizing agent.

*Example 2*

A stream of oxygen-ozone mixture was passed into a reaction flask equipped with a gas dispersion stirrer, Dry Ice condenser, and a thermometer, which flask contained 44.0 g. (0.0526 mole) of bis[α-(dihexyloxyphosphinyl)benzyl] phenyl phosphite in 30 ml. of methylene chloride, cooled at −10° C. to −30° C. The rate of ozone input was 38 mg. per liter of oxygen-ozone mixture. After 35 minutes no further ozone was being absorbed as indicated by an ozone meter. When the addition of oxygen-ozone mixture was completed the mixture was warmed to room temperature and purged with nitrogen to remove dissolved oxygen and ozone. The reaction mixture was transferred to a distilling flask and the solvent was removed under vacuum. The residue was concentrated to 80° C./0.15 mm. to obtain 45.3 g. (97.5% yield) of bis[α-(dihexyloxyphosphinyl)benzyl] phenyl phosphate as a pale yellow product.

*Example 3*

A 2.9 g. portion of sulfur was added to 53.3 g. (0.111 mole) of O,O-bis[1-(dimethoxyphosphinyl)ethyl] S-p-chlorophenyl phosphorothioite, and the mixture was stirred for 10 minutes during which time a 5° C. temperature rise from room temperature occurred. The mixture was then heated to 140° C., at which temperature all of the sulfur had reacted. No sulfur precipitated when the product cooled to room temperature. An additional 0.2 g. of sulfur was added and the mixture again warmed to 140° C. There was thus obtained 56 g. (99% yield) of O,O-bis[1-(dimethoxyphosphinyl)ethyl] S-p-chlorophenyl phosphorodithioate as a pale yellow viscous liquid having the structure.

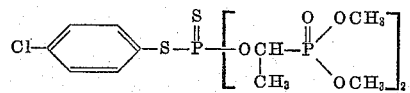

*Example 4*

To 14 g. (0.0224 mole) of bis{1-[bis(2-chloroethoxy)phosphinyl]ethyl} phenyl phosphite in 15 ml. of toluene was added 0.55 g. of sulfur and the resulting mixture stirred at room temperature (24° C.) for 10 minutes. Hating was initiated and the mixture heated at reflux (114–117° C.) for 1 hour. On cooling O,O-bis{1-[bis(2-chloroethoxy)phosphinyl]ethyl} O-phenyl phosphorothioate was obtained as a slightly yellow toluene solution.

*Example 5*

To 70.4 g. (0.0843 mole) of bis{α-(dihexyloxyphosphinyl)benzyl} phenyl phosphite was added 2.2 g. of sulfur at room temperature (25° C.) and the resulting mixture was stirred for 15 minutes during which time a 5° C. temperature rise was observed. The mixture was successively heated to 140° C. while stirring, cooled to determine whether all the sulfur had reacted, treated with small portions (0.1–0.2 g.) of additional sulfur, and reheated to 140°–145° C. until a total of 2.5 g. (92.6% of theory) had been added and no more sulfur would react. On cooling the resulting reaction mixture there was obtained 71.3 g. of clear, pale yellow product (99% yield) which was O,O-bis[α-(dihexyloxyphosphinyl)benzyl] O-phenyl phosphorothioate.

I claim:
1. Compounds of the formula

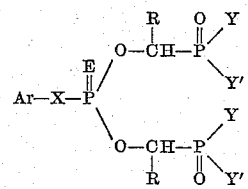

wherein Ar is selected from the group consisting of aromatic hydrocarbon radicals and halogen-substituted aromatic hydrocarbon radicals which are free from aliphatic unsaturation and contain from 6 to 12 carbon atoms; X is selected from the group consisting of oxygen and sulfur; E is selected from the group consisting of oxygen and sulfur; R is selected from the group consisting of hydrogen, aromatic hydrocarbon radicals having from 6 to 12 carbon atoms, and alkyl radicals having from 1 to 11 carbon atoms and the cyclohexyl radical; and Y and Y' are selected from the group consisting of alkyl, alkoxy, and aromatic hydrocarbon and hydrocarbonoxy radicals having up to 12 carbon atoms, and the halogenated derivatives of said radicals.

2. A bis[1-(dialkoxyphosphinyl)alkyl] aryl phosphate wherein the aryl radical has from 6 to 12 carbon atoms and the alkoxy and alkyl radicals each have from 1 to 12 carbon atoms.

3. A O,O-bis[α-(dihaloalkoxyphosphinyl)aralkyl] O-haloaryl phosphorothioate wherein the haloalkoxy radicals are selected from the group consisting of chloroalkoxy and bromoalkoxy radicals having from 1 to 12 carbon atoms, the aralkyl radical has from 7 to 12 carbon atoms, and the haloaryl radicals are selected from the group consisting of chloroaryl and bromoaryl radicals having from 6 to 12 carbon atoms.

4. O,O - bis[1 - phenylethoxyphosphinyl)propyl] O-phenyl phosphorothioate.

5. Bis[α-(dihexyloxyphosphinyl)benzyl] phenyl phosphate.

6. O,O-bis[1-(dimethoxyphosphinyl)ethyl] S-p-chlorophenyl phosphorodithioate.

7. O,O - bis{1 - [bis(2 - chloroethoxy)phosphinyl]ethyl} O-phenyl phosphorothioate.

8. O,O - bis[α - (dihexyloxyphosphinyl)benzyl] O-phenyl phosphorothioate.

9. An O,O - bis[1 - (dialkoxyphosphinyl)alkyl] S-(haloaryl) phosphorodithioate wherein the alkoxy and alkyl radicals each have from 1 to 12 carbon atoms, and the haloaryl radical has from 6 to 12 carbon atoms.

References Cited in the file of this patent
UNITED STATES PATENTS
2,807,636    Buls et al. _____ Sept. 24, 1957

OTHER REFERENCES

Alimov et al.: Bull. Acad. Sci. USSR Div. of Chem. Sci. (English translation), 929–934 (1955).